United States Patent Office 3,463,670
Patented Aug. 26, 1969

3,463,670
HIGH ENERGY DENSITY THERMAL CELL
Bhaskara M. L. Rao, Billerica, and Robert W. Holmes, North Reading, Mass., assignors to P. R. Mallory & Co., Inc., Indianapolis, Ind., a corporation of Delaware
Filed May 26, 1967, Ser. No. 641,585
Int. Cl. H01m 21/14
U.S. Cl. 136—83                                          13 Claims

ABSTRACT OF THE DISCLOSURE

A solid electrolyte thermal cell comprising an alkali metal anode, a sulfur cathode, and a solid separator of an alkali metal halide, constituting the electrolyte, interposed between said anode and cathode and in contact therewith. The cell may serve as a low current voltage source at room temperature or as a source delivering relatively high currents at high temperatures below the melting point of the separator.

Background of the invention

This invention relates to solid electrolyte cells, and, more particularly to cells of the described general type which can be used as low current voltage sources at normal equipment temperatures, as well as to form reserve and non-reserve cells with high rate thermal characteristics.

The cells of the invention are characterized by long shelf life and higher energy density than conventional cells. They may be subjected to quick thermal activation and are capable of operating under a wide range of current drains. Also, the cells are simply constructed from inexpensive and readily available materials and may be miniaturized, if desired. Furthermore, they are rugged in construction and as a result can withstand large accelerational forces.

Summary

Broadly stated, in accordance with the principles of the invention, there is provided a solid electrolyte thermal cell comprising an anode, a cathode, and a separator between said electrodes and in contact therewith. The anode may be any alkali metal, such as lithium, sodium or potassium. The cathode is composed essentially of sulfur mixed with 1% to 20% by weight of an inert electronic conductor, such as graphite, carbon, or tantalum powder. Addition of 0.01% to 30% by weight of alkali metal halide or alkali metal sulfide to the sulfur-carbon cathode mix increases area of the reaction zone of the cathode. The cathode material thus obtained may be held in position as a thin slab, or contained in a porous conducting matrix. The separator, which also serves as the electrolyte, may comprise an alkali metal halide, for example a fluoride, chloride, bromide or iodide salt of lithium, sodium, or potassium. The alkali halide may be cast in the form of a slab or cup from the melt. In order to improve its mechanical strength, the alkali halide may be impregnated in porous or woven discs or cups of inert non-conducting fibrous materials, such as glass or ceramics. The net thickness of such separator assembly may be from 0.001 cm. to 0.05 cm. The conductivity of the halide separator may be improved by adding small amounts of 0.001 M to 0.2 M divalent halides of magnesium, cadmium, barium, strontium and the like. Examples of cell systems embodying the invention are Li/lithium halide/sulfur; Na/sodium halide/sulfur and K/potassium halide/sulfur.

The electric capability of the above mentioned cell systems depends upon the thickness of the separator layer and on the temperature of operation. It is essential that the cell temperature should not exceed the melting point of the alkali halide separator used. Heating of the cells to obtain high rate operation may be carried out by conduction, convection or radiation from any heat source or by employing a built-in chemical heat source, such as a pyrophoric paper structure placed against the major surface of individual cells. A large number of types of pyrotechnic heat sources are commercially available, for example one constituted by a blend of zirconium metal fuel and barium chromate oxidizers suitably loaded on inorganic paper. The latter may be activated by flame from a percussion primer, a fuse, an electric match or arc, or their equivalents.

Brief description of the drawing

The invention will now be more fully described, reference being had to the accompanying drawing, in which.

Description of the preferred embodiments

Figure 1:
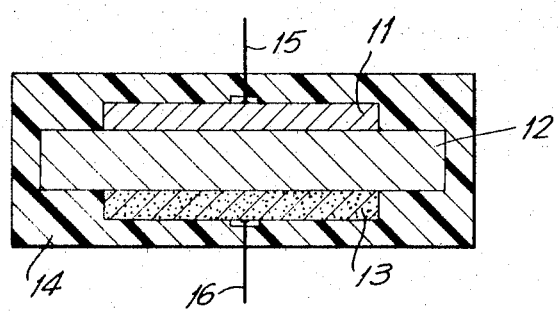
FIG. 1 is a vertical sectional view, somewhat diagrammatic and fragmentary in character, of a solid electrolyte cell embodying the invention.

Referring now to the drawing, FIGURE 1 is a vertical sectional view of a typical alkali metal-sulfur cell having a solid alkali halide separator and employing lithium, lithium iodide and sulfur. The cell comprises a circular slab 11 of lithium 0.1 cm. thick and 0.82 cm.$^2$ in area, a circular slab 12 of lithium iodide 0.227 cm. thick and 1.5 cm.$^2$ in area, and a cathode pellet 13 composed of sulfur and 20% by weight of graphite, having the same dimensions at the lithium anode 11. These components are encapsulated in Teflon casing 14 from which lead wires 15 and 16, respectively connected to the anode and cathode, extend. Encapsulation can be carried out in various ways, for example by adhesively securing two or more parts of the cell casing together, as those skilled in the art will readily understand. As it has been pointed out in the foregoing, the separator 12 is cast of fused lithium iodide and the cathode 13 is a compressed body of a mixture of sulfur and graphite powders in suitable proportions.

To increase the capacity of the cell, heat may be applied to one of the major external surfaces thereof in any desired manner. During heating, the lithium anode 11 may melt but will remain confined between separator 12 and casing 14. It is essential, therefore, that the cell temperature should not exceed the melting point of the separator layer.

Figure 2:
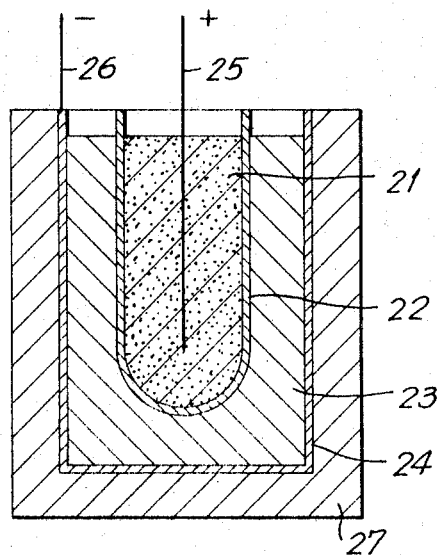
FIG. 2 is a similar view of a high capacity cell operated at temperatures above room temperature but below the melting point of the separator.

FIGURE 2 is a vertical sectional view of a high capacity solid electrolyte thermal cell embodying the invention. Reference numeral 21 denotes the sulfur cathode which may have 1% to 20% by weight of an inert electronic conductor, such as graphite, carbon, tantalum powder, or the like, admixed therewith. A cup-shaped separator 22 surrounds the cathode and my be formed of lithium diode by casting or by impregnating into a porous or woven cup made of inert non-conducting fibrous material, such as glass or ceramics. Lithium anode 23 is arranged in contact with separator 22 and current collector 24 made of an inert metal foil, such as stainless steel or tantalum. Lead wires 25 and 26, respectively connected to cathode 21 and anode 23, extend from the cell and constitute the electrical terminals thereof. Numeral 27 denotes the heat source which may operate through conduction, convection or radiation, or may utilize an exothermic chemical reaction.

Figure 3:
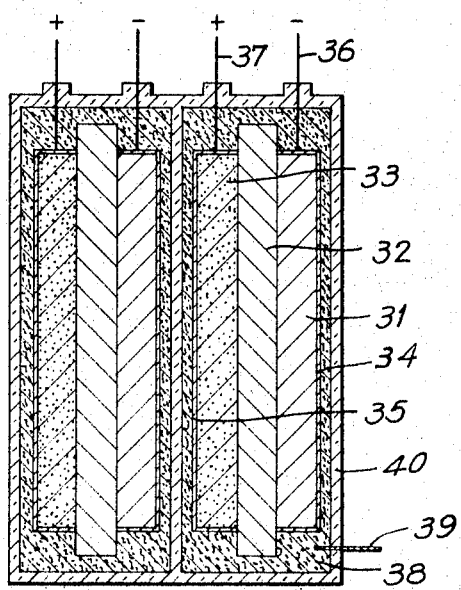
FIG. 3 is a similar view of another modified embodiment of the invention in a reserve type battery comprising a pair of cells.

FIGURE 3 illustrates a reserve type battery comprising a pair of cells. Since the two cells are identical in structure, only one of them will be described. Reference numeral 31 denotes the anode of lithium, 32 the separator of lithium iodide, and 33 the cathode of sulfur and of a smaller amount of an electronically conducting inert material. A current collector 34 of stainless steel or tantalum foil is placed around the exposed surfaces of anode 31 and a similar current collector 35 is placed around the exposed surfaces of cathode 33. Current leads 36 and 37 are respectively connected to the anode and cathode current collectors 34 and 35 and constitute the corresponding terminals of the cell.

The entire cell is surrounded by a layer 38 of pyrotechnic paper or similar material adapted to be activated by a fuse 39 capable of being electrically energized thereby to initiate combustion of the chemical heat source. The entire cell, as well as its companion cell are encapsulated in cell casing 40 made of ceramic or of some other electronically non-conducting heat-resistant material.

A reserve cell of the described type may be maintained in its inoperative condition for years without any appreciable deterioration and can be activated practically instantaneously to deliver relatively high currents.

Operation

The general cell reactions during the discharge process in the cell of the invention are the following:
At the anode:

$$M \rightarrow M^+ + e \qquad (Eq.\ 1)$$

The $M^+$ (metal ions) liberated at the anode are transported across the separator to the cathode side, where they combine with sulfide ions liberated in the reaction:

$$S + 2e = S^- \qquad (Eq.\ 2)$$

The net discharge reaction is:

$$2M + S = M_2S \qquad (Eq.\ 3)$$

The sequence of reactions is reversed upon charging a discharge cell.

Figure 4:
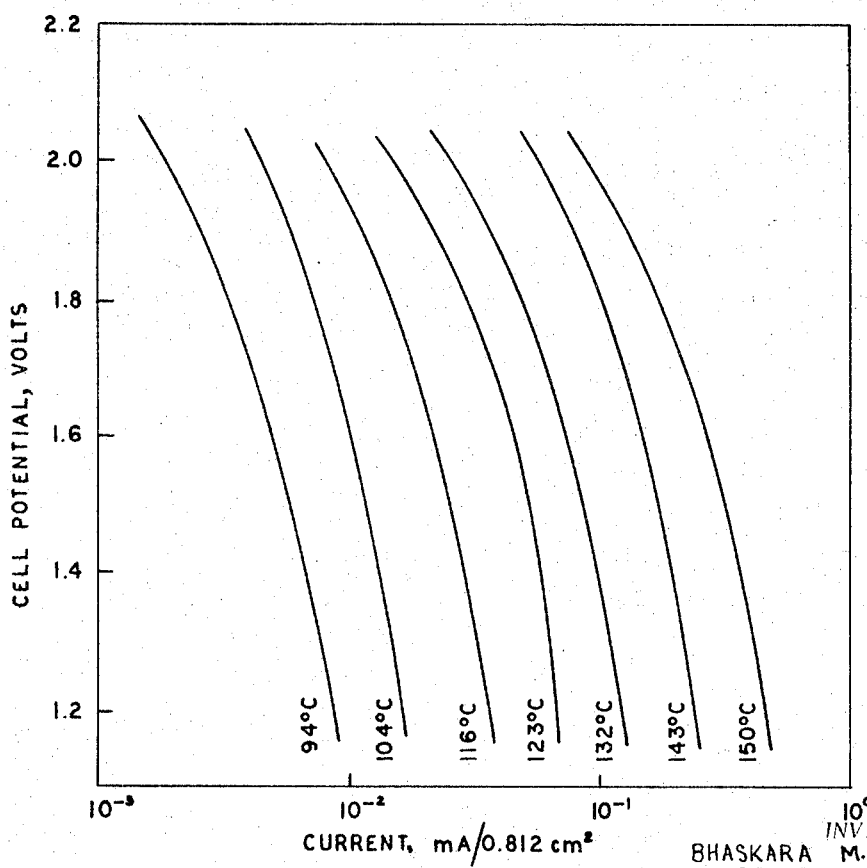
FIG. 4 is a family of curves illustrating the voltage-current characteristics of a Li/LiI/S solid electrolyte thermal cell at temperatures between 94° C. and 150° C.

As to the operating characteristics, the open circuit cell voltage is governed by the anode-cathode combination. This is 2.2 to 2.3 v. in the case of Li/LiI/S. The current delivering capability is determined mainly by the resistance of the separator. The latter decreases with increasing temperature. This is characteristic of thermal cells, and is seen in FIGURE 4, illustrating the voltage-current characteristics of a Li/LiI/S solid electrolyte thermal cell at temperatures between 94° C. and 150° C., respectively. Further increases of temperature favor better cell performance. The same is true for other alkali metal-sulfur cells.

Although the present invention has been disclosed in connection with a few preferred embodiments thereof, variations and modifications may be resorted to by those skilled in the art without departing from the principles of the invention. All of these variations and modifications are considered to be within the true spirit and scope of the present invention, as disclosed in the foregoing description and defined by the appended claims.

We claim:
1. A solid electrolyte cell comprising an anode of an alkali metal, a cathode of sulfur, and a separator of a solid alkali metal halide constituting the electrolyte interposed between and in contact with said anode and cathode.
2. A solid electrolyte cell as claimed in claim 1 in which the anode is an alkali metal selected from the group consisting of lithium, sodium and potassium.
3. A solid electrolyte cell as claimed in claim 1 in which the sulfur cathode contains in admixture therewith 1% to 20% by weight of an inert material of higher conductivity selected from the group consisting of graphite, carbon and tantalum powder.
4. A solid electrolyte cell is claimed in claim 3 in which the cathode mix also contains an addiition of 0.01% to 30% by weight of material selected from the group consisting of alkali metal halides and alkali metal sulfides.
5. A solid electrolyte cell as claimed in claim 1 in which the alkali metal halide separator is selected from the group consisting of LiF, LiCl, LiBr, LiI, NaF, NaCl, NaBr, NaI, KF, KCl, KBr, KI, and mixtures thereof.
6. A solid electrolyte cell as claimed in claim 1 in which conductivity of the halide separator is improved by adding thereto small amounts of 0.001 M to 0.2 M divalent halides of a metal seelcted from the group consisting of magnesium, cadmium, barium and strontium.
7. A solid electrolyte cell as claimed in claim 1 in which at least one of the cell components is impregnated in a porous conducting matrix.
8. A solid electrolyte cell as claimed in claim 1, the output current of which is increased by heating the cell to a temperature above room temperature but below the melting point of the separator.
9. A solid electrolyte cell as claimed in claim 1 in which the cell components are confined and are maintained in desired cooperative relation within a casing.
10. A solid electrolyte thermal cell comprising an anode of an alkali metal, a cathode of which the electrochemically active component is sulfur, a separator of a solid alkali metal halide constituting the electrolyte interposed between and in contact with said anode and cathode, and heating means for said cell thereby to activate the same without melting said separator.
11. A solid electrolyte thermal cell as claimed in claim 10 in which a casing is provided for the assembly of electrodes with the separator, and the heating means comprise a heat source external of the said casing and constituting the heating means.
12. A solid electrolyte thermal cell as claimed in claim 10 in which a heat source is built in the cell and is adapted when activated to heat the cell, and means for initiating activation of the said heat source.
13. A thermally activated reserve type cell comprising an alkali metal anode, a sulfur cathode, a separator of a solid alkali metal halide constituting the electrolyte between and in contact with said anode and cathode, a built-in chemical heat source in contact with a heat conducting surface of the cell, and a fuse operable to initiate operation of said heat source.

References Cited
UNITED STATES PATENTS

| | | |
|---|---|---|
| 2,928,890 | 3/1960 | Van Der Grinten et al. |
| 2,954,417 | 9/1960 | Lehovec et al. |
| 3,007,992 | 11/1961 | Lehovec. |
| 3,279,952 | 10/1966 | Minnick. |
| 3,311,503 | 3/1967 | Zellhoefer. |

WINSTON A. DOUGLAS, Primary Examiner

A. SKAPARS, Assistant Examiner

U.S. Cl. X.R.

136—100